United States Patent [19]
Johansen

[11] Patent Number: 5,250,143
[45] Date of Patent: Oct. 5, 1993

[54] HEATABLE SHOE FOR A JOINT WELDING APPARATUS FOR OVERLAPPING PORTIONS OF WEBS

[75] Inventor: Tore Johansen, Oslo, Norway

[73] Assignee: A/S Fjeldhammer Brug, Fjellhamar, Norway

[21] Appl. No.: 901,143

[22] Filed: Jun. 19, 1992

[30] Foreign Application Priority Data

Jan. 30, 1992 [NO] Norway .................................. 920400

[51] Int. Cl.⁵ .............................................. B32B 35/00
[52] U.S. Cl. ................................... 156/499; 156/535; 156/544; 156/546; 156/547; 156/549
[58] Field of Search ............... 156/499, 544, 546, 547, 156/549, 554, 535, 502, 152, 157

[56] References Cited

U.S. PATENT DOCUMENTS

| 3,953,272 | 4/1976 | Webber | 156/152 |
| 4,484,976 | 11/1984 | Despins | 156/578 |
| 4,504,352 | 3/1985 | Meyer | 156/499 |
| 4,602,978 | 7/1986 | Eckstein | 156/564 |

Primary Examiner—Michael W. Ball
Assistant Examiner—J. Sells
Attorney, Agent, or Firm—Cushman, Darby & Cushman

[57] ABSTRACT

A heatable shoe for a joint welding apparatus for overlapping joint welding of asphalt roofing is designed in such a way that it will be able to produce a wave of liquid asphalt in an opening or slit between a front and a rear part of the shoe, thereby producing a maximum quantity of liquid asphalt inwards to a line approximately in the center of the overlapping portions between the roofing webs. This is where the mechanical fasteners are located, which are thus baked or embedded in and sealed by in liquid asphalt in a favorable manner.

8 Claims, 2 Drawing Sheets

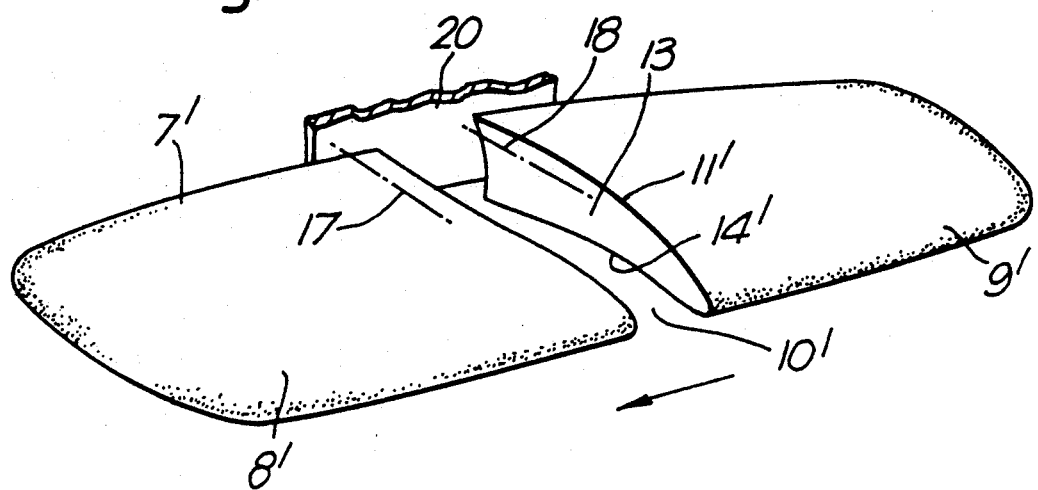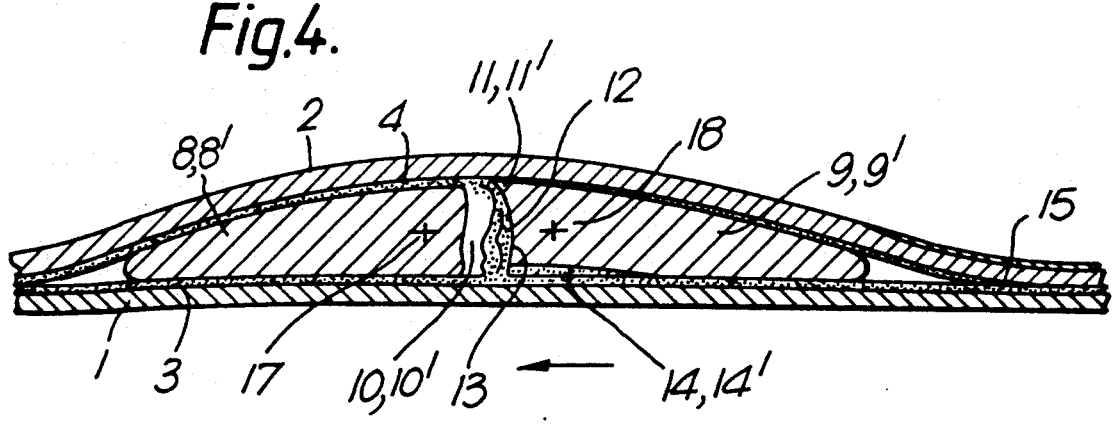

HEATABLE SHOE FOR A JOINT WELDING APPARATUS FOR OVERLAPPING PORTIONS OF WEBS

BACKGROUND OF THE INVENTION

The invention relates to a heatable shoe for a joint welding apparatus for insertion between an underlying and an overlying portions of respective strips of a web material, such as asphalt roofing, to be joint welded through overlapping.

The invention has been developed in connection with the methodology which is used today when laying roofing on a base layer, where the roofing is rolled out on the roof base and laid with a certain interdependent overlapping. The general practice today for asphalt roofing is to heat the overlapping portions by means of a propane torch so that the overlapping portions are fused together. Hot air is also known to be used.

The types of hot air apparatus used today may deliver hot air with a temperature ranging from 20° C. to 700° C. The actual efficiency is poor and problems are frequently encountered in connection with electrical heating of the hot air at the building site (due to available fuses being too weak). Welding by means of a propane torch will yield temperatures that are higher than that of the hot air. Excessive heat supply will result in a fire hazard, since one has little or no control over the conditions underneath the overlapping web portions. Overheating may lead to melting and thereby destruction of heat-sensitive insulation, such as polystyrene. Under unfavourable conditions the temperature may be so high that the roof construction may ignite.

A proposal has also been made to make use of an electrically heatable shoe which is inserted between the underlying and overlying layers. With such a shoe, it has been difficult to achieve proper melting and welding. One reason is that a coking layer may easily form on the shoe. The cause for this is presumed to be that air or oxygen has relatively free access to the engaging surfaces between the asphalt roofing and the hot shoe. The coating destroys the desirable good heat contact within a short period of time.

The use of pressure means will to a large degree prevent this unfavourable coking and the coating resulting therefrom. The reason for this is presumed to be that air or oxygen to a large degree is prevented from entering the sensitive area between the shoe and the web material, since the pressure means will press the web material against the shoe and the close contact thereby achieved will to a large degree prevent coking or baking.

Use of a heatable shoe will also entail such great advantages, namely primarily good heat distribution and high efficiency, as well as elimination of the fire hazard, that it is desirable to use this special technique.

In the overlapping regions in asphalt roofing, the bottom underlying web is fastened to a respectively underlying substrate, e.g., a roof base by mechanical fastening means, and here it is particularly important to bring about an absolutely free flow of adhesive so that the mechanical fasteners can "drown", i.e., become embedded in the adhesive mass. Such "accumulation" of the adhesive, usually liquid asphalt, may to some extent be brought about through the use of a torch or hot air, but so far it has not been possible to bring this about through the use of a heatable shoe. Thus there is an obvious need for improvement of the shoe technique so as to arrive at a solution which not only has the same favourable characteristics as those of the torch/hot air technique, but which will be even better from an overall point of view.

SUMMARY OF THE INVENTION

According to the invention there is therefore provided a heatable shoe for a joint welding apparatus for insertion between respective portions of an underlying and an overlying web material, such as asphalt roofing, to be joint welded by means of overlapping, and the main characteristic of the shoe is that it is designed in two parts having a front and a rear part, which are fixed or articulated with respect to each other, in such a way that there is an opening between them through which liquid asphalt or similar material can flow.

During joint welding, with such a shoe design, the opposite overlapping areas will be heated and the asphalt on the underside of the layer, which has thereby become more or less liquid, will then be able to flow as a wave of liquid asphalt down through the opening or slit in the shoe and towards the underlying overlapped layer where mechanical fastening means may be located.

In practice it will most of the time be important that the shoe be articulated, especially if the shoe is long. The reason for this is the fact that an articulated shoe will more easily follow and adapt to an uneven roof surface. It is also essential that the adhesive, e.g. asphalt, be able to flow down to the underside of the shoe, since this will result in a more controlled distribution of the adhesive in the overlapping area.

It may be particularly advantageous if the front edge of the rear part have a greater height in relation to the front part, so that this front edge can function as a scraper, for scraping loose a wave of liquid asphalt which passes down through the opening or slit in the shoe.

It may be particularly appropriate that the shoe have a shallow groove extending from the opening or slit, pointing towards the rear of the shoe.

Such a groove may advantangeously serve to control the flow of the scraped liquid adhesive precisely into the relevant area where the mechanical fastening means are located.

The shoe may be in one piece, but as mentioned, a particularly advantageous design is a shoe designed in two parts, with a front and a rear part articulated to each other.

This makes possible the mounting of the shoe in such a way that the two parts can move somewhat in relation to each other, while adapting to irregularities in the roof surface.

The mounting may be such that each shoe part is rotatably mounted to a horizontal transversal axis, or the two parts of the shoe may, in a limited manner, be rotatably mounted about a common horizontal transversal axis.

The aforementioned forward portion of the rear part, i.e., the portion which has the extra height is advantageously finished with a sharp upper edge, which is oriented towards the opening or slit, resulting in a knife-like edge which serves to scrape off the more or less melted adhesive from the underside of the overlying layer of web material. For control of the scraped mass, the forwardly facing, generally upstanding and generally transversally oriented end surface of the rear part or second part of the shoe, facing the opening or slit, may advantageously have a concave shape in a longitudinal section through the shoe, i.e. parallel to the direction of the joint welding.

In order to facilitate the insertion and movement of the shoe during preparation and welding, the shoe may advantageously be designed with transversally tapering cross sections.

BRIEF DESCRIPTION OF THE DRAWINGS

The invention will now be further explained with reference to the drawings, in which:

FIG. 3 shows a perspective drawing of a second embodiment of a shoe according to the invention, and FIG. 4 shows a longitudinal section through the shoe of FIG. 3, and showing the shoe inserted in an overlapping area where joint welding is to be carried out.

DETAILED DESCRIPTION

Figure 1:
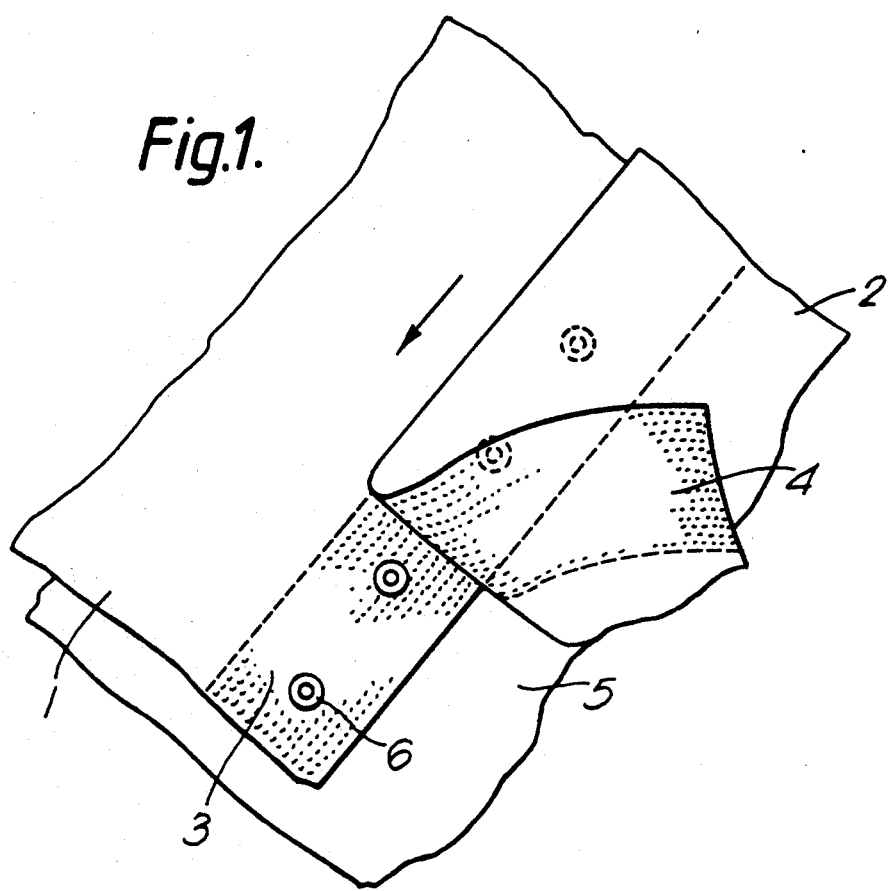
FIG. 1 shows a part of the overlapping area for two sheets or layers of web material, e.g. asphalt roofing.

In FIG. 1 is shown a portion of an overlapping area between two roofing webs 1 and 2. Underlying roofing web 1 has an edge area 3 coated with asphalt and in this example the overlying roofing web 2 has an equivalent edge, area, asphalt coated on the underside 4. Web 1 is fastened to the roof base 5 by means of mechanical fasteners 6, for example consisting of nails with matching broad washers interposed between the nailheads and the roofing web. The upper roofing web 2 is laid with a certain amount of overlapping (at 3, 4) and the two asphalted edge areas 3, 4 are welded together by means of suitable heating.

Figure 2:
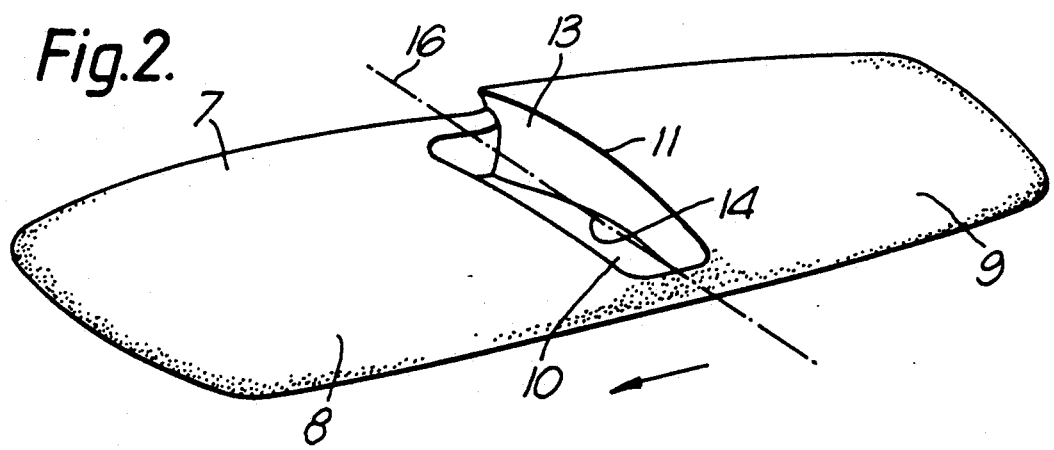
FIG. 2 shows a perspective drawing of a first embodiment of a shoe according to the invention.

In FIG. 2 is shown a heatable shoe 7 which may be used for such heating or for joint welding of the roofing webs. The shoe 7 is pushed in and under the overlapping edge areas 3, 4 (FIG. 1) and is moved forward longitudinally in the direction of the joint weld as indicated by the arrow in FIG. 1 and 2, while the asphalt coatings 3, 4 under within the overlapping areas are heated (the shoe is hot) and are melted or joined together.

The shoe 7 in FIG. 2 is designed as a single element, with a first, front part 8, behind which is a second part 9. As shown, the shoe 7 has an opening 10 between parts 8 and 9, and the second part 9 is designed so as to have extra height in relation to the first part 8, thereby forming a scraping edge 11 (FIG. 4).

This scraping edge 11 will function as a scraper for at least part of the asphalt coating 4 on the overlaying web 2. The asphalt coating 4 will be heated by the front part of the shoe 8 and the scraping edge on knife 11 will therefore produce an asphalt flow 12 which is guided down through the opening 10, towards the underlying web 1, or more precisely, the asphalt coating 3, which is also heated by the front part of the shoe 8. This asphalt flow will be concentrated in an inward, central movement, i.e. towards the longitudinal area where the mechanical fasteners 6 are located, so that these mechanical fasteners will receive an extra supply of asphalt and thereby "drown" in a flow of asphalt. Control of the asphalt flow that has been scraped off, to the central area where the fasteners 6 are located, is aided by the fact that the rear part 9 has a concave end surface 13, facing the opening 10. Moreover, the shoe has on its underside a shallow groove 14, pointing towards the rear, connected to the opening, contributing further to a controlled collection of liquid asphalt centrally along the overlapping area where the mechanical fasteners are located.

Also, the rear part 9 of the shoe is heated and contributes further to heating and keeping the asphalt coatings at 4 and 3 liquid, with final fusing of the two asphalt coatings taking place behind the shoe in area 15, indicated in FIG. 4.

Shoe 7, can be mounted into a suitable joint-welding apparatus in an appropriate manner, and in FIG. 2 it is indicated that the shoe 7, to a certain limit, can be rotatably mounted about a transversal axis 16. The purpose is to make it possible to adapt the shoe to minor irregularities in the roof surface.

In FIG. 3 there is shown a modified design of the shoe 7, indicated as 7'. The difference with regard to the design in FIG. 2 is only that the shoe in FIG. 3 is provided in two longitudinally parts, so that the opening separated between the front part 8' and the rear part 9' is now a transversally complete slit 10'.

The section shown in FIG. 4 therefore also applies to the shoe in FIG. 3, and the same reference figures have been used, with the addition of an index ('). The two shoe parts in FIG. 3 may be mounted to one another or to another structure, so as to be relatively movable in a rotatable manner separately about respective transverse axes 17, 18 (FIG. 4), in an indicated carrier 20, but they may also be mounted in a rotatable manner about one and the same axis, in that each shoe part then will have protruding lugs towards the other shoe part, which will thus function as side limitations in slit 10', thereby achieving a shape of the opening more like the opening 10 in FIG. 2.

The essential point is that the shoe has a front part and a rear part, preferably with an extra height upstanding and surface for the rear part. This will allow scraping of the asphalt coating which has been softened from the heat effect from the front part, thereby creating a wave of asphalt mass which can flow down through the opening or slit in the shoe, and which is preferably guided towards the central area i.e., medially of the shoe and medially of the underlapped area 3 where the fastening means 6 may be located, so that these fastening means thereby are ensured a sufficiently large supply of melted asphalt mass. This will create great certainty that this sensitive area is properly sealed.

Both shoe 7 and shoe 7' have longitudinally and transversally tapering cross sections in through the overlapping area, and the shoe is designed with rounded edges and corners. The shoe is preferably heated by means of electricity, in a manner which is not illustrated further, by means of heating elements which have not been shown in.

I claim:

1. A heatable shoe for a joint welding apparatus for running longitudinally along an area of overlapment between an underlying web of material having an upper surface, and being supported on a base, and an overlapping web of material having a heat-softenable sealant applied on an under surface in a portion thereof which is disposed vertically in overlapping registry with a portion of said underlying web of material, said shoe comprising:

a front part and a rear part, said front part and rear part being arranged to articulate relative to one another about respective transversally oriented horizontal axes while disposed with longitudinal spacing between a trailing end surface of said front part and a leading end surface of said rear part, thereby defining a transversally extending opening down through said shoe delimited in part by said leading end surface;

said front and rear parts having respective undersurfaces arranged to be slid along on said upper surface on said portion of said underlying web of material, said undersurfaces being generally horizontal; and said front and rear parts having respective upper surfaces arranged to be slid along in contact with said heat-softenable sealant on said undersurface of said portion of said overlying web of material, so that as said shoe is advanced longitudinally along said area while being heated, said heat-softenable sealant, as softened by said shoe can flow down through said opening and under said under surface of said rear part and onto said upper surface of said portion of said underlying web of material, and, longitudinally behind said shoe said heat softenable sealant can adhere said portion of said underlying web of material to said portion of said overlying web of material.

2. The heatable shoe of claim 1, wherein:

said leading end surface of said rear part extends upwards from said undersurface of said rear part further than does said trailing end surface of said front part from said undersurface of said front part; said leading end surface of said rear part being upstanding and generally transversally arranged to serve as a scrapper for scrapping some of said heat softenable sealing from said undersurface of said portion of said overlying web of material.

3. The heat sealable shoe of claim 1, further comprising:

means defining a longitudinally elongated shallow groove in said undersurface of said rear part of said shoe, extending rearwardly thereon from said opening, so that some heat-softenable material which flows down through said opening is concentrated to flow medially under said rear part of said shoe.

4. The heat sealable shoe of claim 1, wherein:
said transverse axes are substantially coincident.

5. The heat sealable shoe of claim 1, wherein:
said leading end surface of said rear part is forwardly convex about a generally horizontal axis and intersects said upper surface of said rear part of said shoe along a sharp, scraping edge.

6. The heat sealable shoe of claim 1, wherein:
said shoe tapers from centrally thereof towards a leading end of said front part and a trailing end of said rear part.

7. The heat sealable shoe of claim 6, wherein:
said shoe tapers from one longitudinal side thereof towards an opposite longitudinal side thereof.

8. The heatable shoe of claim 1, wherein:
said front part is articulated to said rear part by being flexibly connected thereto along longitudinally opposite sides of said shoe.

* * * * *